W. C. KING.

Jelly-Jars.

No. 6,172.

Reissued Dec. 15, 1874.

Witnesses:
James Martin Jr.
J. A. Campbell.

Inventor:
William C. King
by
Mason Fenwick & Lawrence
Attys.

THE GRAPHIC CO. PHOTO-LITH. 39 & 41 PARK PLACE, N.Y.

UNITED STATES PATENT OFFICE.

WILLIAM C. KING, OF PITTSBURG, PENNSYLVANIA.

IMPROVEMENT IN JELLY-JARS.

Specification forming part of Letters Patent No. 138,502, dated May 6, 1873; reissue No. 6,172, dated December 15, 1874; application filed November 2, 1874.

*To all whom it may concern:*

Be it known that I, WILLIAM C. KING, of Pittsburg, county of Allegheny and State of Pennsylvania, have invented an improvement for temporarily fastening the covers on vessels; and I do hereby declare that the following is a full, clear, and exact description thereof, reference being had to the accompanying drawings, making a part of this specification, in which—

Figure 1:
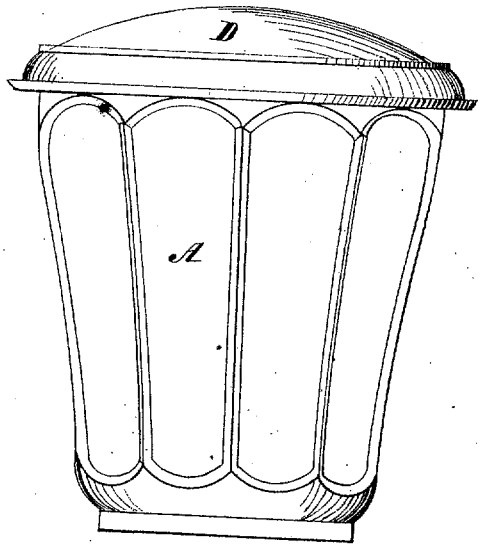
Figure 2:
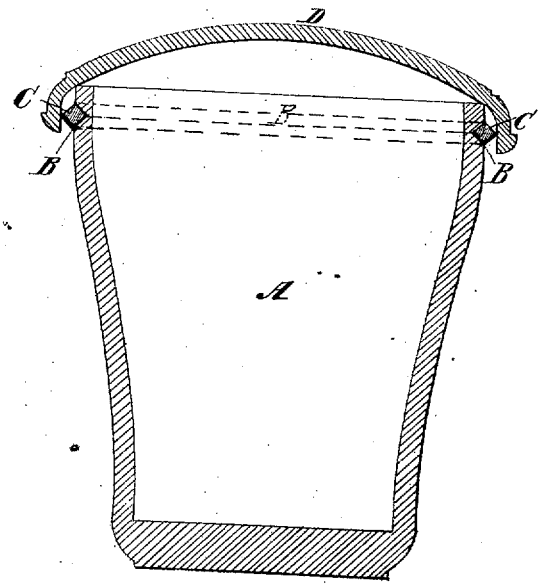

Figure 1 is an external elevation of a vessel, the cover of which is fastened in accordance with my invention. Fig. 2 is a vertical central section of the same.

The nature of my invention consists, first, in the combination of a vessel having a V-shaped groove in its periphery near its top, a gum or elastic ring, which in cross-section has a lozenge or diamond shape, and a flanged lid or cover; second, in a gum or elastic ring applied in a groove of any suitable form in a vessel, and formed with a knife-edge on its outer side, and bearing against the inner surface of the flange of the cover with said edge.

By this invention a dust-tight joint between the cover and the vessel, and at the same time an exceedingly slight elastic action to retain the cover in place, are secured, and thus while dust and vapors are excluded, and the cover prevented from casually falling off when the vessel is turned over too far, the cover can be removed and replaced with the greatest speed, ease, and convenience.

The form of the ring shown is very desirable, as it enables me to give it the proper body or uniform thickness throughout, and yet, when applied in the V-groove, will have a knife-edge impingement against the inner surface of the flange of the cover, and, being elastic and flexible, will yield downwardly and inwardly sufficiently to allow the cover to be placed upon the vessel, and also hold the cover on the vessel when the hand is withdrawn.

In the accompanying drawings, A represents the vessel. It may be made of glass, and at its upper edge or mouth a V-shaped groove, B, is formed. C is a gum or elastic ring, of lozenge or diamond form in cross-section. This ring is placed in the groove B, so that about one-half of the longest diameter of the lozenge or diamond projects beyond the outer surface of the vessel. D is the lid or cover. It also may be of glass, and be formed by the pressing process. This cover is of a little less diameter than the outer diameter of the ring, so that when the vessel is filled, and the cover is forced down upon it and over the ring, the knife-edge of the ring will be deflected and compressed slightly, and thereby caused to fill irregular surfaces of the flange of the cover, so as to exclude dust and other impurities from the contents of the vessel; and, while this is the case, the lid may be removed and replaced with facility at pleasure.

With this improvement the inconvenience arising from hermetically-sealed vessels is avoided, and for many kinds of articles, such as jellies, which are used daily, it is important, as it enables the housekeeper to close up the vessel during the use of the vessels upon the table, as well as when in the cupboard, without causing her or others much inconvenience, as they can be very easily reopened when necessary.

What I claim is—

1. The combination of a vessel, A, having a V-groove in its outer periphery near its top, a gum or elastic ring, C, of lozenge or diamond form in cross-section, and a flanged cover, D, substantially as and for the purpose described.

2. A gum or elastic ring applied in a groove of a vessel, A, and formed with a knife-edge on its outer side, and bearing against the flange of the cover with said edge, substantially as and for the purpose described.

WM. C. KING.

Witnesses:

WILLIAM F. ROBB,

GEO. M. IRWIN.